May 13, 1924.  
C. W. HACK  
COMPRESSOR  
Filed June 5, 1922

1,493,935

INVENTOR  
Charles W. Hack.  
BY  
ATTORNEY.

Patented May 13, 1924.

1,493,935

UNITED STATES PATENT OFFICE.

CHARLES W. HACK, OF TOPEKA, KANSAS, ASSIGNOR TO THE HOME REFRIGERATING COMPANY, OF TOPEKA, KANSAS, A CORPORATION OF KANSAS.

COMPRESSOR.

Application filed June 5, 1922. Serial No. 565,829.

*To all whom it may concern:*

Be it known that I, CHARLES W. HACK, a citizen of the United States, residing at Topeka, in the county of Shawnee and State of Kansas, have invented certain new and useful Improvements in Compressors; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in air compressors and it particularly relates to an oil trapping device to prevent the entrainment of oil on the compression side of the cylinder.

The prevention of the oil entrainment is accomplished by utilizing a velocity retarder for the gas on the exterior of the cylinder, the velocity retarder being shown as an enlarged chamber which provides an auxiliary gas supply for the crank case to thereby equalize the pressure of the gas entering the crank case from the inlet to the compressor and by providing this equalization of pressure I eliminate liability of sudden pressure changes in the crank case, such as a sudden increase of pressure against the bearings or stuffing boxes with resultant disadvantages.

Most air compressors have means for separating the oil from the compressed gas leaving the compressor and in some instances attempts have been made to return the entrained oil in the compression chamber back to the crank case side of the piston, but my invention differs from these in that it prevents the entrainment of the oil on the compression side of the piston, it being the primary object of my invention to prevent any liquid reaching the compression side of the piston for when this is accomplished, liability of blowing off the valve block or cylinder head will be eliminated and oil separators exterior of the compressor for separating the oil from the compressed fluid become unnecessary.

The novel structure of the invention as well as the advantages accruing therefrom will be apparent by reference to the following description in connection with the accompanying drawings, in which:—

Figure 1:
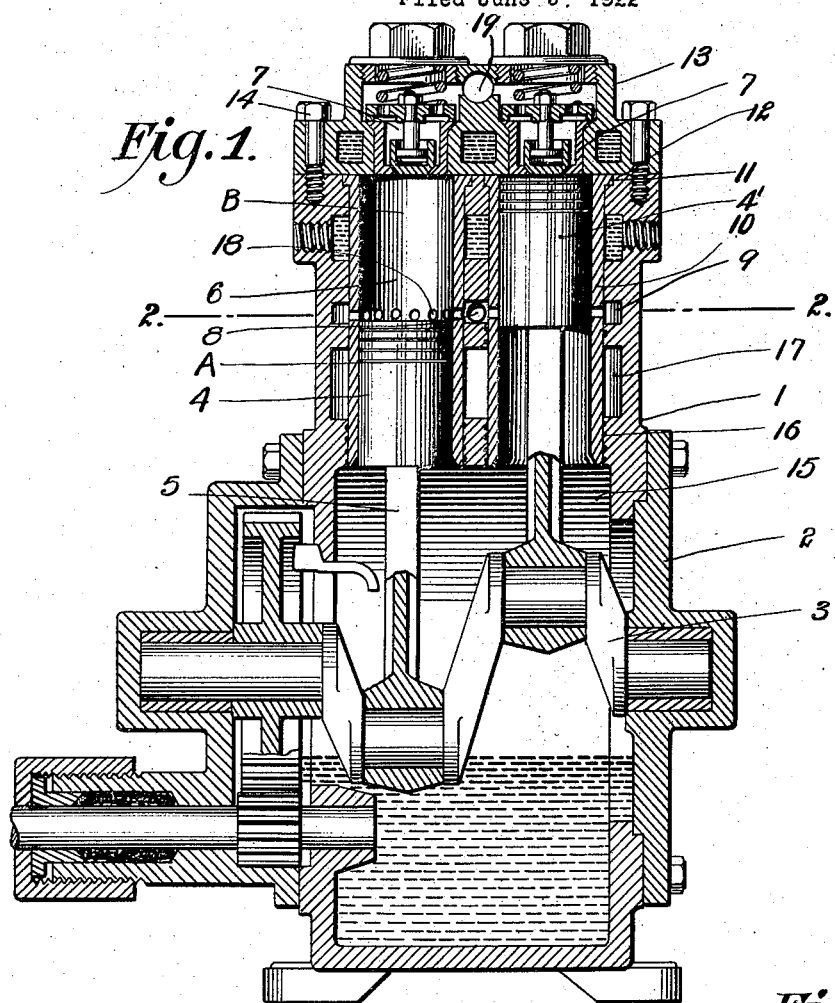
Fig. 1 is a vertical, longitudinal, sectional view through an air compressor constructed in accordance with my invention.
Figure 2:
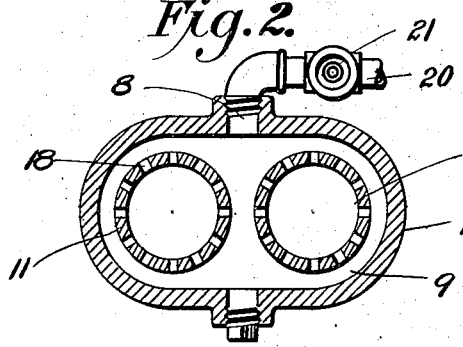
Fig. 2 is a cross section on the line 2—2 of Fig. 1.
Figure 3:
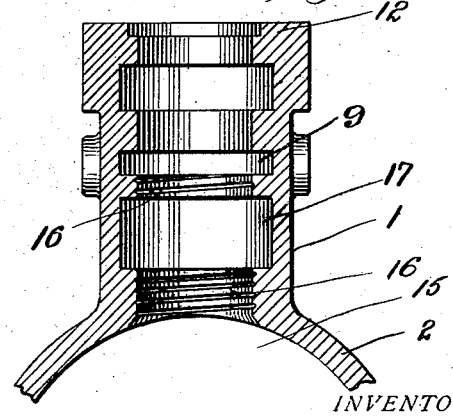
Fig. 3 is a sectional view of part of the cylinder block showing the velocity retarder or oil trapping and auxiliary gas supply chamber.

Referring now to the drawings by numerals of reference:

The compressor is shown as consisting of a cylinder block 1 connected to a crank case 2, in which is a crank shaft 3, connected to the pistons 4 by connecting rods 5, and operating in the cylinders 6 having the outlet valves 7. This much of the invention is characteristic of other compressors.

My invention includes means for preventing the entrainment of oil on the compression side of the pistons as well as to provide an auxiliary gas supply to maintain an equality of pressure within the crank case. The inlet port 8 communicates with an intake passage 9, which surrounds the cylinders 6. The cylinders are shown as comprising sleeves or cylindrical liners 10 having annular flanges 11 at their upper ends which are riveted in the offset portions 12 of the block and which are held in place by the valve head 13, which is fastened directly to the block by the bolts 14.

Communicating the intake passage 9 with the chamber 15 of the crank case is a port 16, shown as comprising a spiral groove, interrupted intermediate its ends by an enlarged chamber 17. The groove for each cylinder is preferably cut into the block and it is closed by its cylinder 6 to provide a spiral conduit. The intake passageway 9 surrounding each cylinder communicates with the compression chambers of the cylinder through the inlet ports 18, arranged preferably in circumferential series about the axis of the piston and the axis of the cylinder in which the piston is operating.

When the crank shaft is turning, the piston A, for example, will be taking in a charge. The gas under pressure will be admitted to the intake port 9, on past into the compression chamber B, through the ports 18 and, on the upstroke of the piston A, the gas will be compressed to be passed out through the outlet port 19, as will be well understood; the outlet valve mechanism 7 operating for the escape of the gas.

The piston 4′ will have just discharged its compressed charge by forcing its outlet valve off its seat and it is shown as in a position to move to gas-intaking position with the piston 4 moving to gas-compressing position. This is well understood.

Since the intake port 9 communicates unimpededly with the crank case, gas will also flow into the crank case and since it is under pressure, due to the movements of the pistons 4 and 4′, it would pass through the spiral groove 16 at very high velocity were not an expansion chamber, oil trap and auxiliary gas reservoir 17 located intermediate the ends of the spiral groove.

The walls of the spiral groove form vapor and oil collars, the oil in the liquid form and in the vapor form being collected on the walls of the spiral groove before it enters the inlet ports 18; consequently, liability of the oil being entrained on the compression side of the piston will be eliminated. It will be noted that the oil and vapor are not trapped or collected below the lower ends of the cylinder. If baffles were placed below the cylinder, they would prevent the splash system of lubrication from being successful so it is desirable that there be an open space in the crank case to allow the splash system of lubrication to function and at the same time prevent the oil, either in the vapor phase or the liquid phase, from entering the compression side of the piston because if it does, a slug of oil will pass into the line through the discharge ports of the cylinders and as is well known, if the oil and ammonia combine, the efficiency of the system is decreased. Therefore, it is an important point in my invention to keep oil out of the compression side of the cylinder.

In order to prevent the high velocity and in order to supply gas from an auxiliary means, the chamber 17 is made a part of the cylinder block, thereby eliminating the liability of sudden pressures within the crank case. The crank is shown as being lubricated by the splash system and since there will be more or less churning of the oil in the crank case, it is obvious that it will combine or mix with the gas, which may pass upwardly through the spiral groove, carrying with it the oil which would be entrained on the compression side of the piston were it not for the fact that the intermediate chamber 17 was provided, which cuts down the velocity of the gas passing upwardly and allows the gas to come to practically a state of rest or to such slow velocity that the oil will be condensed and allowed to gravitate back through the spiral groove into the crank case. Therefore, the oil is arrested by the walls of the groove as well as by the chamber 17 and the capacity of the groove and the chamber is sufficient to separate the oil from the gaseous vapor before it can reach the inlet ports 18.

In the event that there is any moisture carried along with the gas when it enters the intake port, it will likewise have a tendency when it reaches the intake 9 to gravitate through the spiral groove into the chamber 17 and thence to the crank case so that the oil is trapped and delivered to the crank case before it has any opportunity of getting on the compression side of the piston.

There is another advantage in constructing the device along the lines above enumerated and that is that access to the interior of the crank case for inspection or repairs can be greatly facilitated. For example, the gas supply pipe 20 is provided with a valve 21. When it is desired to have access to the crank case, the valve 21 will be closed and the compressor will be allowed to operate a short time so that it will create a vacuum in the cylinders. When the pistons pass on their intake strokes beyond the ports 18, they will suck the gas from the crank case into the cylinders and on their out strokes, will force it out to the cylinders within the line. Therefore, a partial vacuum will be created in the crank case. All of the gas, for example, refrigerant, will be exhausted from the crank case so that the crank case can be opened without any liability of the escape of the refrigerant or gas which would be obnoxious to the operator. In other words, by simply turning the valve 21, the crank case will be entirely exhausted of whatever gas is being delivered by the compressor. This is a marked advantage over any known type of compressor with which I am familiar.

What I claim and desire to secure by Letters-Patent is:

1. In a compressor, a cylinder block having an intake passage, a cylinder in the block communicating with the intake passage, a valved outlet for the cylinder, a crank case, a crank shaft in the crank case, a piston in the cylinder connected to the crank, and an oil collecting means between the ends of the cylinder having an enlarged chamber intermediate its ends, the oil collecting chamber being in open communication with the crank case whereby the collected oil can gravitate to the crank case and thereby prevent oil from passing into the compression side of the cylinder.

2. In a compressor, a cylinder block having an intake passage, a cylinder in the block communicating with the intake passage, a valved outlet for the cylinder, a crank case, a crank in the crank case, a piston in the cylinder connected to the crank, and an oil collecting conduit communicating the intake passage with the crank case, the conduit being located between the ends of the cylinder and having a velocity arresting means intermediate its ends, the velocity arresting means providing an oil collecting chamber whereby oil passing from the crank case into the conduit will be trapped and returned to the crank case before it can enter the cylinder.

3. In a compressor, a cylinder block having an intake passage, a cylinder in the block communicating with the intake passage, a valved outlet for the cylinder, a crank case, a crank shaft in the crank case, a piston in the cylinder connected to the crank, a conduit communicating the intake passage with the crank case, and a velocity arresting means intermediate the ends of the conduit, said velocity arresting means comprising an expansion and oil collecting chamber to collect the oil during its passage from the crank case side of the conduit to the cylinder side of the conduit to thereby trap the oil and prevent its introduction into the cylinder, the conduit being in open communication with the crank case so that the trapped oil can gravitate back to the crank case.

4. In a compressor, a cylinder block having an intake passage, a cylinder in the block communicating with the intake passage, a valved outlet for the cylinder, a crank case, a crank shaft in the crank case, a piston in the cylinder connected to the crank case, and a conduit communicating the intake passage with the crank case and provided with an oil collecting means between the ends of the cylinder to prevent the entrainment of the oil on the compression side of the piston, the collecting means including an enlarged chamber intermediate the ends of the conduit.

5. In a compressor, a cylinder block having an intake passage, a cylinder in the block communicating with the intake passage, a valved outlet for the cylinder, a crank case, a crank shaft in the crank case, a piston in the cylinder connected to the crank, and a spiral conduit communicating the intake passage with the crank case whereby oil passing from the crank case to the spiral conduit will be subjected to centrifugal force against the outer walls of the conduit to cause the oil to collect upon the walls of the conduit and gravitate back into the crank case.

6. In a compressor, a cylinder block having an intake passage, a cylinder in the block communicating with the intake passage, a valved outlet for the cylinder, a crank case, a crank shaft in the crank case, a piston in the cylinder connected to the crank case, and a spiral conduit communicating the intake passage with the crank case and provided with an enlarged chamber intermediate the ends thereof.

7. In a compressor, a cylinder block having an intake passage, a cylinder in the block communicating with the intake passage, a valved outlet for the cylinder, a crank case, a crank shaft in the crank case, a piston in the cylinder connected to the crank case, a spiral conduit in open communication with the intake passage and with the crank case, the walls of the spiral conduit constituting oil baffling means, and a velocity retarding means intermediate the ends of the spiral conduit.

In testimony whereof I affix my signature.

CHARLES W. HACK.